United States Patent
Siclovan et al.

(10) Patent No.: US 9,545,618 B2
(45) Date of Patent: Jan. 17, 2017

(54) METHOD FOR PREPARING A CATALYST COMPOSITION SUITABLE FOR REMOVING SULFUR FROM A CATALYTIC REDUCTION SYSTEM

(71) Applicant: General Electric Company, Schenectady, NY (US)

(72) Inventors: Oltea Puica Siclovan, Rexford, NY (US); Daniel George Norton, Niskayuna, NY (US); Larry Neil Lewis, Scotia, NY (US); Dan Hancu, Clifton Park, NY (US); Xiaoying Bao, Schenectady, NY (US); Robert Burch, Northern Ireland (GB); Christopher Hardacre, Northern Ireland (GB); Sarayute Chansai, Northern Ireland (GB)

(73) Assignee: General Electric Company, Niskayuna, NY (US)

(*) Notice: Subject to any disclaimer, the term of this patent is extended or adjusted under 35 U.S.C. 154(b) by 96 days.

(21) Appl. No.: 14/305,914

(22) Filed: Jun. 16, 2014

(65) Prior Publication Data

US 2014/0294710 A1    Oct. 2, 2014

Related U.S. Application Data

(62) Division of application No. 13/165,184, filed on Jun. 21, 2011, now abandoned.

(51) Int. Cl.
*B01J 21/04* (2006.01)
*B01J 23/66* (2006.01)
(Continued)

(52) U.S. Cl.
CPC ............ *B01J 23/66* (2013.01); *B01D 53/8603* (2013.01); *B01D 53/9418* (2013.01); *B01J 35/10* (2013.01);
(Continued)

(58) Field of Classification Search
CPC ............ B01J 21/04; B01J 23/50; B01J 23/66; B01J 37/105
(Continued)

(56) References Cited

U.S. PATENT DOCUMENTS

| 4,480,050 A | 10/1984 | Brennan |
| 5,244,852 A | 9/1993 | Lachman |

(Continued)

FOREIGN PATENT DOCUMENTS

| DE | 4128629 A1 | 3/1993 |
| DE | 4128629 | 8/1999 |

(Continued)

OTHER PUBLICATIONS

Raman, et al., Template-Based Approaches to the Preparation of Amorphous, Nanoporous Silicas, 1996, Chem. Mater., 8,1682-1701.

(Continued)

*Primary Examiner* — Patricia L Hailey
(74) *Attorney, Agent, or Firm* — Joseph J. Christian

(57) ABSTRACT

A method of preparing a catalyst composition suitable for removing sulfur from a catalytic reduction system and the catalyst composition prepared by the method are provided. The method of preparation of a catalyst composition, comprises: combining a metal oxide precursor, a catalyst metal precursor and an alkali metal precursor in the presence of a templating agent; hydrolyzing and condensing to form an intermediate product that comprises metal oxide, alkali metal oxide, and catalyst metal; and calcining to form a
(Continued)

templated amorphous metal oxide substrate having a plurality of pores wherein the alkali metal oxide and catalyst metal are dispersed in an intermixed form in the metal oxide substrate.

10 Claims, 10 Drawing Sheets

(51) Int. Cl.
| | |
|---|---|
| B01J 35/10 | (2006.01) |
| B01J 37/00 | (2006.01) |
| B01D 53/94 | (2006.01) |
| B01D 53/86 | (2006.01) |
| B01J 23/50 | (2006.01) |

(52) U.S. Cl.
CPC ...... B01J 37/0018 (2013.01); B01D 2255/104 (2013.01); B01D 2255/2022 (2013.01); B01D 2255/2025 (2013.01); B01D 2255/2027 (2013.01); B01D 2257/302 (2013.01); B01D 2257/404 (2013.01); B01D 2258/012 (2013.01); B01J 23/50 (2013.01); B01J 35/1061 (2013.01); B01J 35/1066 (2013.01)

(58) Field of Classification Search
USPC ............ 502/347; 516/97; 423/242.1, 244.01, 423/244.02, 244.06, 244.07, 244.1
See application file for complete search history.

(56) References Cited

U.S. PATENT DOCUMENTS

| | | | |
|---|---|---|---|
| 5,510,306 A | 4/1996 | Murray | |
| 5,609,839 A | 3/1997 | Itoh | |
| 5,750,459 A | 5/1998 | Marella | |
| 5,770,778 A | 6/1998 | Naujokas | |
| 5,772,972 A | 6/1998 | Hepburn | |
| 5,795,559 A | 8/1998 | Pinnavaia | |
| 5,802,845 A | 9/1998 | Abe | |
| 5,879,645 A | 3/1999 | Park | |
| 5,911,966 A | 6/1999 | Muller | |
| 6,146,602 A | 11/2000 | Narula | |
| 6,284,211 B1 | 9/2001 | Miyadera | |
| 6,703,343 B2 | 3/2004 | Park | |
| 6,881,390 B2 | 4/2005 | Yaluris | |
| 6,936,232 B2 | 8/2005 | Gillespie | |
| 7,045,485 B2 | 5/2006 | Kelkar | |
| 7,081,231 B1 | 7/2006 | Aardahl | |
| 7,132,165 B2 | 11/2006 | Pinnavaia et al. | |
| 7,214,643 B2 | 5/2007 | Yamamoto | |
| 7,371,358 B2 | 5/2008 | Upchurch | |
| 7,431,905 B2 | 10/2008 | Hancu | |
| 7,485,271 B2 | 2/2009 | Golunski | |
| 7,494,634 B2 | 2/2009 | Vitse | |
| 7,612,011 B2 | 11/2009 | Vanderspurt et al. | |
| 7,655,203 B2 | 2/2010 | Hancu | |
| 7,709,414 B2 | 5/2010 | Fujdala | |
| 7,803,338 B2 | 9/2010 | Socha | |
| 7,867,598 B2 | 1/2011 | Miyairi | |
| 8,034,311 B2 | 10/2011 | Ikeda | |
| 8,037,674 B2 | 10/2011 | Kupe | |
| 8,062,991 B2 | 11/2011 | Male et al. | |
| 8,101,145 B1 | 1/2012 | Norton | |
| 8,353,155 B2 | 1/2013 | Lewis et al. | |
| 8,476,187 B2 | 7/2013 | Norton et al. | |
| 8,505,285 B2 | 8/2013 | Winkler et al. | |
| 8,530,369 B2 | 9/2013 | Lewis et al. | |
| 8,586,501 B2 | 11/2013 | Lewis | |
| 2003/0118960 A1 | 6/2003 | Park | |
| 2003/0134745 A1 | 6/2003 | Balmer-Millar | |
| 2003/0176280 A1 | 9/2003 | Caze | |
| 2005/0135980 A1 | 6/2005 | Park | |
| 2005/0198092 A1 | 9/2005 | Shen | |
| 2006/0009349 A1 | 1/2006 | Fujimoto | |
| 2006/0075742 A1 | 4/2006 | Lee | |
| 2006/0133976 A1 | 6/2006 | Male | |
| 2006/0228283 A1 | 10/2006 | Malyala | |
| 2007/0059223 A1 | 3/2007 | Golunski | |
| 2007/0101704 A1 | 5/2007 | Goulette | |
| 2007/0149385 A1 | 6/2007 | Liu | |
| 2008/0020925 A1 | 1/2008 | Larcher | |
| 2008/0053073 A1 | 3/2008 | Kalyanaraman | |
| 2008/0085231 A1 | 4/2008 | Vitse | |
| 2008/0124264 A1 | 5/2008 | Ikeda | |
| 2008/0131345 A1 | 6/2008 | Vitse | |
| 2008/0141660 A1 | 6/2008 | Kim | |
| 2009/0004079 A1 | 1/2009 | Hancu | |
| 2009/0074641 A1* | 3/2009 | Lewis ................ B01D 53/9418 423/213.2 |
| 2009/0075813 A1 | 3/2009 | Whisenhunt | |
| 2009/0263297 A1 | 10/2009 | Hancu | |
| 2009/0318283 A1 | 12/2009 | Keshavan | |
| 2010/0095591 A1 | 4/2010 | Hancu | |
| 2010/0143227 A1 | 6/2010 | Keshavan et al. | |
| 2010/0150801 A1 | 6/2010 | Keshavan et al. | |
| 2010/0196236 A1 | 8/2010 | Lewis et al. | |
| 2010/0196237 A1 | 8/2010 | Yin et al. | |
| 2010/0233053 A1 | 9/2010 | Lewis et al. | |
| 2011/0047988 A1 | 3/2011 | Lewis et al. | |
| 2011/0047995 A1 | 3/2011 | Lewis | |
| 2011/0120100 A1 | 5/2011 | Yin et al. | |
| 2011/0152064 A1* | 6/2011 | Keshavan ................ B01J 23/50 502/62 |
| 2011/0152068 A1* | 6/2011 | Keshavan ................ B01J 23/50 502/159 |
| 2011/0166015 A1 | 7/2011 | Norton | |
| 2011/0209466 A1 | 9/2011 | Yin et al. | |
| 2012/0047877 A1 | 3/2012 | Winkler | |
| 2012/0082606 A1 | 4/2012 | Lewis et al. | |
| 2012/0093703 A1 | 4/2012 | Lewis et al. | |
| 2012/0329644 A1 | 12/2012 | Siclovan et al. | |
| 2013/0129575 A1 | 5/2013 | Lewis et al. | |

FOREIGN PATENT DOCUMENTS

| | | |
|---|---|---|
| EP | 207550 B1 | 9/1990 |
| EP | 0577438 | 5/1994 |
| EP | 0207550 | 9/1995 |
| EP | 0714693 | 6/1996 |
| EP | 0787522 | 8/1997 |
| EP | 0947236 | 10/1999 |
| EP | 1029582 | 8/2000 |
| EP | 0895812 | 7/2003 |
| EP | 0914864 | 8/2007 |
| EP | 1832345 | 9/2007 |
| EP | 1944075 | 7/2008 |
| FR | 2842419 | 1/2004 |
| JP | 4354536 | 8/1992 |
| JP | 4354536 A | 12/1992 |
| JP | 6126134 | 5/1994 |
| JP | 6126134 A | 5/1994 |
| JP | 06343829 | 12/1994 |
| WO | 9929400 | 6/1996 |
| WO | 2005035108 | 4/2005 |
| WO | 2005035108 A1 | 4/2005 |
| WO | 2006027998 | 3/2006 |
| WO | 2006027998 A1 | 3/2006 |
| WO | 2006093802 | 9/2006 |
| WO | 2007049851 | 5/2007 |
| WO | 2009038855 | 3/2009 |
| WO | 2009038901 | 3/2009 |
| WO | 2011084484 | 7/2011 |

OTHER PUBLICATIONS

Dean et al., "Oxygen Adsorption on a Potassium-Promoted Ag Catalyst", Journal of Catalysis, 1989, vol. 115, pp. 138-147.

Arias et al., "Study of the Lean NOx Reduction with C3H6 in the Presence of Water over Silver/Alumina Catalysts Prepared from Inverse Microemulsions", Applied Catalysis B: Environmental, vol. 28, Issue 1, Sep. 18, 2000, pp. 29-41.

(56) References Cited

OTHER PUBLICATIONS

Son et al., "On the Promotion of Ag/γ-Al2O3 by Cs for the SCR of NO by C3H6", Catalysis Letters, 2001, vol. 75, Issue 3-4, pp. 191-197.
Burch et al., "A Review of the Selective Reduction of NOx with Hydrocarbons under Lean-Burn Conditions with Non-Zeolitic Oxide and Platinum Group Metal Catalysts", Applied Catalysis B: Environmental, vol. 39, Issue 4, Dec. 20, 2002, pp. 283-303.
Iliopoulou et al., "Ag/Alumina Catalysts for the Selective Catalytic Reduction of NOx using various Reductants", Applied Catalysis A: General, vol. 274, Issues 1-2, Oct. 28, 2004, pp. 179-189.

\* cited by examiner

METHOD FOR PREPARING A CATALYST COMPOSITION SUITABLE FOR REMOVING SULFUR FROM A CATALYTIC REDUCTION SYSTEM

BACKGROUND

The invention relates generally to a catalyst composition and particularly to a catalyst composition and system for reducing nitrogen oxides (NOx) through selective catalytic reduction (SCR).

Exhaust streams generated by the combustion of fossil fuels in, for example, furnaces, ovens, and engines, contain nitrogen oxides (NOx) that are undesirable pollutants. There is a growing need to have efficient and robust emission treatment systems to treat the NOx emissions.

In selective catalytic reduction (SCR) using hydrocarbons (HC), hydrocarbons serve as the reductants for NOx conversion. Hydrocarbons employed for HC—SCR include relatively small molecules like methane, ethane, ethylene, propane, and propylene, as well as longer linear hydrocarbons like hexane, octane, etc., or branched hydrocarbons like iso-octane. The injection of several types of hydrocarbons has been explored in some heavy-duty diesel engines to supplement the HC in the exhaust stream. From an infrastructure point of view, it would be advantageous to employ an on-board diesel fuel as the hydrocarbon source for HC—SCR.

Fuels, including gasoline or diesel fuels containing sulfur lead to a number of disadvantages when trying to clean the exhaust gases by some form of catalytic after-treatment. During the combustion process, sulfur in the fuel gets converted to sulfur dioxide ($SO_2$), which poisons some catalysts. Further poisoning happens from the formation of base metal sulfates from the components of a catalyst composition, which sulfates can act as a reservoir for poisoning sulfur species within the catalyst.

When the SCR catalysts absorb the NOx in the exhaust gas, they also absorb sulfur oxides (SOx) in the exhaust gas. The sulfur oxides poison the catalysts and as a result, the NOx absorption performance declines as the poisoning by the sulfur oxides (SOx) increases. Therefore, there is a need to reduce sulfur absorption by the SCR catalysts and prevent catalyst degradation.

BRIEF DESCRIPTION

In one embodiment, a catalyst composition is presented. The catalyst composition includes a templated amorphous metal oxide substrate having a plurality of pores, a catalyst material having a catalyst metal and disposed on the substrate, and a sulfur scavenger having an alkali metal and disposed on the substrate.

In one embodiment, a method of preparation of a catalyst composition is presented. The method includes combining a metal oxide precursor, a catalyst metal precursor and an alkali metal precursor in the presence of a templating agent, hydrolyzing and condensing to form an intermediate product that includes metal oxide, alkali metal oxide, and catalyst metal, and then calcining to form a templated amorphous metal oxide substrate having a plurality of pores and includes an alkali metal oxide and catalyst metal.

In one embodiment, a catalytic reduction system is presented. The catalytic reduction system includes a catalyst support and a catalyst composition disposed on a catalyst support. The catalyst composition that includes a templated amorphous metal oxide substrate having a plurality of pores, a catalyst material having a catalyst metal and disposed on the substrate, and a sulfur scavenger having an alkali metal and disposed on the substrate.

In one embodiment, a system is provided. The system includes an internal combustion engine, and a catalytic reduction system disposed to receive an exhaust stream from the engine. The catalytic reduction system includes a catalyst support and a catalyst composition disposed on a catalyst support. The catalyst composition includes a templated amorphous metal oxide substrate having a plurality of pores, a catalyst material having a catalyst metal and disposed on the substrate, and a sulfur scavenger having an alkali metal and disposed on the substrate.

In one embodiment, a method of removing sulfur from a catalytic reduction system is presented. The method includes passing an exhaust stream from an internal combustion engine over a catalyst composition. The catalyst composition includes a templated amorphous metal oxide substrate, a catalyst material comprising a catalyst metal, and a sulfur scavenger. During operation, the exhaust stream reacts with the catalyst composition to form sulfates; the sulfates decompose to produce sulfur oxides that are eventually removed from the catalytic reduction system.

DETAILED DESCRIPTION

Figure 1:
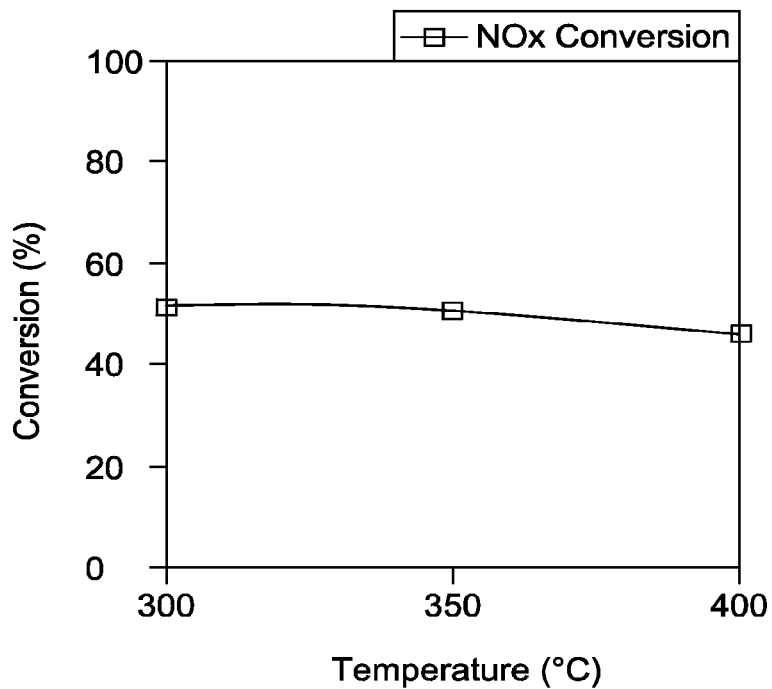
FIG. 1 is a graph depicting the NOx reduction activity of undoped, fresh 4.5 mole percent silver on templated amorphous alumina (Ag-TA) catalyst composition.

The systems described herein include, without limitation, embodiments that relate to a catalyst composition, and embodiments that relate to a catalytic reduction system including the catalyst composition and to a system using the catalytic reduction system for reducing nitrogen oxides. Generally disclosed is a NOx reduction catalyst and NOx reduction system for reducing NOx in exhaust gas discharged from a combustion device. Suitable combustion devices may include furnaces, ovens, or engines.

In the following specification and the claims that follow, the singular forms "a", "an" and "the" include plural referents unless the context clearly dictates otherwise.

As used herein, a catalyst is a substance that can cause a change in the rate of a chemical reaction. The catalyst may participate in the reaction and get regenerated at the end of the reaction. "Templating" refers to a controlled patterning; and, "templated" refers to determined control of an imposed pattern and may include molecular self-assembly. The method of templating and templated patterns are described in US publications 2010/0233053 A1 and 2010/0196263 A1, which are incorporated herein by reference. "Amorphous" refers to material characterized by a lack of the long-range order generally observed for crystalline substances.

A "monolith" as used herein includes a ceramic block having a number of channels, and may be made by extrusion of clay, binders and additives that are pushed through a dye to create a structure. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. All temperatures given herein are for the atmospheric pressure. One skilled in the art would appreciate that the boiling points can vary with respect to the ambience pressure of the fuel.

In one embodiment, a composition is presented. The composition includes a templated amorphous metal oxide substrate having a plurality of pores, and a catalyst material and a sulfur scavenger disposed on the substrate. The catalyst material includes a catalyst metal and the sulfur scavenger includes an alkali metal. As used herein, the amount of catalyst metal and alkali metal are presented as percentages of the substrate. Unless otherwise mentioned, the percentages presented herein are in mole percent. The mole percentage is the fraction of moles of dopant element out of the moles of the templated substrate. For example, in Ag-TA (silver-templated alumina), silver is presented as a fraction of moles of templated alumina ($Al_2O_3$).

The substrate may include an inorganic material. Suitable inorganic materials may include, for example, oxides, carbides, nitrides, hydroxides, carbonitrides, oxynitrides, borides, or borocarbides. In one embodiment, the inorganic oxide may have hydroxide coatings. In one embodiment, the inorganic oxide may be a metal oxide. The metal oxide may have a hydroxide coating. Other suitable metal inorganics may include one or more metal carbides, metal nitrides, metal hydroxides, metal carbonitrides, metal oxynitrides, metal borides, or metal borocarbides. Metallic cations used in the foregoing inorganic materials can be transition metals, alkali metals, alkaline earth metals, rare earth metals, or the like.

In one embodiment, the catalyst substrate includes oxide materials. In one embodiment, the catalyst substrate includes alumina, zirconia, silica, zeolite, or any mixtures comprising these elements. Suitable substrate materials may include, for example, aluminosilicates, aluminophosphates, hexaaluminates, zirconates, titanosilicates, titanates, or a combination of two or more thereof. In one exemplary embodiment, the metal oxide is an aluminum oxide. In other embodiments, other substrates may be suitable and can be selected based on end-use parameters.

In one embodiment, the substrate is in the form of a powder. The desired properties of the catalyst substrate include, for example, a relatively small particle size and high surface area. In one embodiment, the powder of the catalyst substrate has an average diameter that is less than about 100 micrometers. In one embodiment, the average diameter is less than about 50 micrometers. In a further embodiment, the average diameter is from about 1 micrometer to about 10 micrometers. The catalyst substrate powder may have a surface area greater than about 100 $m^2$/gram. In one embodiment, the surface area of the catalyst substrate powder is greater than about 200 $m^2$/gram. In one embodiment, the surface area is in a range of from about 200 $m^2$/gram to about 500 $m^2$/gram, and, in another embodiment, from about 300 $m^2$/gram to about 600 $m^2$/gram.

One way of forming templated substrates is by employing templating agents. Templating agents facilitate the production of catalyst substrates containing directionally aligned forms. The templating agent may be a surfactant, a cyclodextrin, a crown ether, or mixtures thereof. An exemplary templating agent is octylphenol ethoxylate, commercially available as TRITON X-114®.

The catalyst substrate may have periodically arranged pores of determined dimensions. The median diameter of the pores, in some embodiments, is greater than about 2 nm. The median diameter of the pores, in one embodiment, is less than about 100 nm. In some embodiments, the median diameter of the pores is in a range from about 2 nm to about 20 nm. In another embodiment, the median diameter is from about 20 nm to about 60 nm and in yet another embodiment, the diameter is from about 60 nm to about 100 nm. The pores in some embodiments have a periodicity greater than about 50 Å. The pores in some embodiments have a periodicity less than about 150 Å. In one embodiment, the pores have a periodicity in the range of from about 50 Å to about 100 Å. In another embodiment, the pores have a periodicity in the range from about 100 Å to about 150 Å.

In certain embodiments, the pore size has a narrow monomodal distribution. In one embodiment, the pores have a pore size distribution polydispersity index that is less than 1.5. As used herein, the polydispersity index is a measure of the distribution of pore diameter in a given sample. In a further embodiment, the polydispersity index is less than 1.3, and in a particular embodiment, the polydispersity index is less than 1.1. In one embodiment, the distribution of diameter sizes may be bimodal, or multimodal.

In one embodiment, alumina, silica, or aluminum silicate is the substrate or framework for a NOx catalyst. The role of a substrate is to (1) provide robust support/framework at working temperature with corrosive gas and steam and (2) provide gas channels for NOx and reductant to get in touch with the catalytic material.

Suitable catalyst metal may include one or more of gallium, indium, rhodium, palladium, ruthenium, and iridium. Other suitable catalyst metal includes transition metal elements and noble metals including one or more of platinum, gold and silver. In one embodiment, the catalyst metal comprises silver. In one particular embodiment, the catalyst metal is substantially 100% silver.

The catalyst metal may be present in an amount of at least about 0.5 mole percent of the substrate. In one embodiment, the catalyst metal is present in an amount equal to or greater than 3 mole percent of the substrate. In one embodiment, the amount of catalyst metal present is about 6 mole percent of the catalyst substrate. In one embodiment, the catalytic metal may be present in an amount in a range of from about 1 mole percent to about 9 mole percent of the substrate.

In one embodiment, the catalyst composition includes one or more sulfur scavenger. A "sulfur scavenger" as referred herein is a sulfur-reactive material that preferentially reacts with sulfur, compared to the reactivity of the catalyst metal with sulfur. "Sulfur" as used herein includes the sulfur containing compounds such as, for example, $SO_2$.

Suitable sulfur scavengers of the catalyst composition include alkali metals. In the catalyst composition, the alkali metals may be in the compound form. The compound form of sulfur scavenger may exist separately or along with the substrate or catalyst metals. In one embodiment, one or more of lithium, sodium, or potassium is used as a sulfur scavenger. In an exemplary embodiment, the sulfur scavenger includes lithium. In one embodiment, lithium exists as lithium oxide in the catalyst composition. In one embodiment, lithium exists in the hydroxide form. In one more embodiment, lithium exists as lithium aluminum oxide.

The sulfur scavenger of the catalyst composition may exist in different forms. In one embodiment, the sulfur scavenger is in a compound form deposited on the substrate material. In another embodiment, the sulfur scavenger cation is dissolved in the substrate material. In one embodiment, the sulfur scavenger is dispersed in the substrate material. In one particular embodiment, the catalyst material and sulfur scavenger are dispersed in an intermixed form in the substrate material. The "intermixed form" herein refers to an arrangement wherein the catalyst material and the sulfur scavenger are present throughout the body of substrate material.

The sulfur scavenger may be present in an amount of at least about 0.5 mole percent of the substrate. In one embodiment, the sulfur scavenger is present in an amount up to about 15 mole percent of the substrate. In one embodiment, the sulfur scavenger may be present in an amount in a range of from about 3 mole percent to about 10 mole percent of the substrate. In one embodiment, the sulfur scavenger is present in amount equal to or greater than about 5 mole percent of the substrate. In one embodiment, the amount of sulfur scavenger present is about 9 mole percent of the catalyst substrate.

In a method of preparing the catalyst composition, a metal oxide precursor, a catalyst metal precursor and an alkali metal precursor are reacted in the presence of a templating agent by hydrolysis and condensation to form an intermediate that includes the metal oxide, alkali metal oxide, and catalyst metal. This intermediate is then calcined to form a catalyst composition including a templated amorphous metal oxide substrate having a plurality of pores, an alkali metal oxide, and catalyst metal. In one embodiment, the method described results in a catalyst composition, in which the alkali metal sulfur scavenger cation and the catalyst metal are dispersed in an intermixed form in the substrate metal oxide. The catalyst composition prepared by this method provides results that are unexpectedly superior to more conventionally prepared formulations.

In one embodiment, the metal-oxide precursors include inorganic alkoxides. Suitable inorganic alkoxides may include one or more of tetraethyl orthosilicate, tetramethyl orthosilicate, aluminum isopropoxide, aluminum tributoxide, aluminum ethoxide, aluminum-tri-sec-butoxide, aluminum tert-butoxide. In one embodiment, the inorganic alkoxide is aluminum sec-butoxide.

In various embodiments, the solvents include one or more solvents selected from aprotic polar solvents, polar protic solvents, and non-polar solvents. Suitable aprotic polar solvents may include propylene carbonate, ethylene carbonate, butyrolactone, acetonitrile, benzonitrile, nitromethane, nitrobenzene, sulfolane, dimethylformamide, N-methylpyrrolidone, or the like. Suitable polar protic solvents may include water, nitromethane, acetonitrile, and short chain alcohols. Suitable short chain alcohols may include one or more of methanol, ethanol, propanol, isopropanol, butanol, or the like. Suitable non polar solvents may include benzene, toluene, methylene chloride, carbon tetrachloride, hexane, heptane, diethyl ether, or tetrahydrofuran. In one embodiment, a combination of solvents may also be used. Selection of the type and amount of solvent may affect or control the amount of porosity generated in the catalyst composition, as well as affect or control other pore characteristics.

Modifiers may be used to control hydrolysis kinetics of the inorganic alkoxides. Suitable modifiers may include one or more ethyl acetoacetate (EA), ethylene glycol (EG), triethanolamine (TA), or the like.

The templating agents serve as templates and may facilitate the production of catalyst composition including templated amorphous substrate materials, catalyst metal, and alkali metals. The catalyst composition obtained by the calcination of an intermediate product containing metal oxide-alkali metal oxide and catalyst metal may contain directionally aligned pores. Control of the pore characteristic may, in turn, provide control of the particle size of catalytic metal by reducing the catalytic metal lability or propensity to agglomerate. The particle size of catalytic metal may be controlled, with respect to pore formation of the porous template, by controlling or affecting one or more of pore size, pore distribution, pore spacing, or pore dispersity.

In one embodiment, the calcination is conducted at temperatures in a range from about 350 degrees Centigrade to about 800 degrees Centigrade. In another embodiment, the calcination is conducted at temperatures in a range from about 400 degrees Centigrade to about 700 degrees Centigrade. In yet another embodiment, the calcination is conducted at temperatures in a range from about 450 degrees Centigrade to about 750 degrees Centigrade. In one embodiment, the calcination is conducted at a temperature of about 550 degrees Centigrade. In various embodiments, the calcination may be conducted for a time period in a range from about 10 minutes to about 30 minutes, from about 30 minutes to about 60 minutes, from about 60 minutes to about 1 hour, from about 1 hour to about 10 hours, from about 10 hours to about 24 hours, or from about 24 hours to about 48 hours.

In a method of removing sulfur from a catalytic reduction system, an exhaust stream is passed from an exhaust source, such as an internal combustion engine, over the catalyst composition that includes, as described previously, a templated amorphous metal oxide substrate, a catalyst material, and a sulfur scavenger. The exhaust stream reacts with the catalyst composition to form sulfates. During a desulfation step, the sulfate formed decomposes to produce sulfur oxides, which are removed from the system. In one embodiment, desulfation comprises exposing the catalyst to a reducing environment at an effective combination of time and temperature to decompose sulfur-containing species on the catalyst into gaseous sulfur-containing species, such as sulfur oxide species, leaving behind sulfur scavenging solid species (such as alkali metal oxide) on the catalyst.

Without being limited by theory, the inventors envisage a preferential reactivity of sulfur scavenger to the sulfur, in comparison with the catalyst metal reactivity with sulfur. In one embodiment, the sulfur scavenger preferentially reacts with the sulfur to form an alkali metal-sulfur compound. In one embodiment, the alkali metal sulfur scavenger reacts with the $SO_2$ gas and forms alkali metal sulfates preferentially over forming catalyst metal sulfate. In one example, the catalyst composition includes templated amorphous alumina as a substrate, silver as a catalyst, and lithium as a sulfur scavenger; the lithium cation reacts with $SO_2$ gas preferentially relative to silver or alumina, to form lithium sulfate. In general, the lithium sulfate is more easily decomposable compared to silver sulfate. Therefore, during operation, the lithium sulfate formed will readily decompose to release $SO_2$ gas during desulfation. In one embodiment, desulfation is carried out by flowing an excess amount of reductant (Cl:N>10) through the catalytic system in the absence of either $O_2$ or NO at elevated temperatures, for example, from about 300° C.-650° C. In one embodiment, the catalyst was subjected to 5 ppm of $SO_2$ for 8 hours and subjected to desulfation. The desulfation method was able to remove greater than 90% of $SO_2$ at 650° C. when $O_2$ was absent and about 70%-80% of $SO_2$ at 650° C. when NO was absent. The desulfation conditions are unfavorable to re-absorb $SO_2$ gas by lithium, silver or alumina, and therefore the $SO_2$ gas exits the reduction system.

While testing the performance of the catalyst system, inventors surprisingly noticed that the alkali metal sulfur scavengers further assist in reducing undesirable byproducts of emission treatment released from the emission treatment system. By using alkali metal sulfur scavengers, more than 50% reduction in emission of HCN, $CH_3CHO$, and HCHO are recorded in the emission treatment system.

Along with substrate, catalyst metal, and sulfur scavenger, the catalyst composition may also include a promoter for the catalytic reaction of nitrogen oxide reduction. Non-limiting examples of the promoter may include various metals or metal oxides. The promoter may include one or more of indium, gallium, tin, silver, manganese, molybdenum, chromium, germanium, cobalt, nickel, gold, copper, iron, and their oxides. In one embodiment, the sulfur scavenger alkali metal additionally acts as a promoter.

Along with the metals and metal oxides mentioned above, the catalyst composition may further have additional cations dispersed or disposed on the catalyst substrate that enhance hydrothermal stability of the composition and/or the catalytic activity of the catalyst metal. In one embodiment, one or more additional cations may be selected from the group consisting of zirconium, iron, gallium, indium, tungsten, zinc, platinum, and rhodium. In one embodiment, the additional dopant comprises zirconium.

In one embodiment, the catalyst composition can be included in fabricating a catalytic surface. In one embodiment, the catalyst composition can be shaped and formed as a catalyst surface. In another embodiment, a slurry of the catalyst composition in a liquid medium can be formed and contacted with a catalyst support to form a catalytic reduction system with a washcoated monolith catalyst. Therefore, in one embodiment, the catalytic reduction system comprises the catalyst support and the catalytic composition comprising the templated amorphous metal oxide substrate and the catalyst material.

A catalyst support can be in any form including foams, monoliths, and honeycombs. Suitable materials for the catalyst support include ceramics and metals. Examples of ceramics include oxides, such as alumina, silica, titanate compounds, as well as refractory oxides, cordierite, mullite, and zeolite. Other examples include metal carbides and metal nitrides. Carbon may be useful in some embodiments. In specific embodiments, the catalyst support includes silicon carbide, fused silica, activated carbon, or aluminum titanate. Zeolite, as used herein, includes hydrated aluminosilicates, such as analcime, chabazite, heulandite, natrolite, phillipsite, and stilbite. Mullite, as used herein, is a form of aluminum silicate. In another exemplary embodiment, the suitable catalyst support includes metal corrugated forms.

In one embodiment, the slurry of the catalyst powder is washcoated onto a catalyst support such as a monolith. In one embodiment of the invention, the catalyst support is a monolith including cordierite. The applied washcoat may be dried, sintered and used to reduce emission content such as NOx.

In a method of using the catalytic reduction system, the catalytic reduction system is disposed in the exhaust stream of an exhaust gas source, such as an internal combustion engine. An internal combustion engine may be part of any of a variety of mobile or fixed/stationary assets, for example, an automobile, locomotive, or power generator. Because different engines have different combustion characteristics and because of the use of different fuels, the exhaust stream components differ from one system to another. Such differences may include variations in $NO_x$ levels, presence of sulfur, oxygen level, steam content, and the presence or quantity of other species of reaction product. Changes in the operating parameters of the engine may also alter the exhaust flow characteristics. Examples of differing operating parameters may include temperature and flow rate. The catalytic reduction system may be used to reduce $NO_x$ to nitrogen at a desirable rate and at a desirable temperature appropriate for the given system and operating parameters.

In one method of using the catalytic reduction system, the catalytic reduction system is disposed in the exhaust stream of an internal combustion engine. The catalyst composition of the catalytic reduction system reduces nitrogen oxides to nitrogen. The nitrogen oxide present in the gas stream may be reduced at a temperature of about 250° C. or greater. In one embodiment, the reduction occurs at a temperature range of about 250° C. to about 350° C. In another embodiment, the temperature is in the range of about 350° C. to about 500° C. In another specific embodiment the temperature is in the range of about 500° C. to about 600° C. In one exemplary embodiment, the nitrogen oxide present in the gas stream may be reduced at a temperature of less than about 350° C.

EXAMPLES

The following examples illustrate methods and embodiments in accordance with exemplary embodiments, and as such should not be construed as imposing limitations upon the claims. All components are commercially available from common chemical suppliers.

Preparation of Materials:

A 5000 mL 3-neck round bottom flask was set up with a mechanical stirrer, reflux condenser, and addition funnel. About 6.51 g (38.5 mmol) of $AgNO_3$ and about 0.6 g (8.7 mmol) of $LiNO_3$ were dissolved in about 240 mL water and added to the flask for preparing 4.4 mole % of Ag and 1 mol % of Li doping. Different lithium doping level may be achieved by varying the addition of $LiNO_3$. Following the addition to the flask, the mechanical stirrer was turned on and contents of flask were stirred. About 111.9 g of TRITON X-114 was mixed with heptane and added to the flask. The mixture was stirred for 30 minutes at a medium pace under ambient conditions to obtain a white suspension. About 415 g (1.69 mol) of aluminum sec-butoxide $(Al(O^{sec}Bu)_3)$ was added by charging a 1 L polyethylene jar whose cap was equipped with a gas inlet and a dip-tube outlet. Using 4-6 psi nitrogen, a feed of about 2.5 mL/min was achieved. Addition was complete after 180 min. The contents were heated to reflux for 22 h. The solid was recovered by filtration and washed with ethanol. The obtained brown solid was then subjected to pyrolysis at 550° C. under nitrogen and then calcination in air at 550° C.

Catalyst Testing:

After calcination, some powders were tested for fresh performance, performance after one hour of operation, performance after sulfation, and desulfation.

During the test, the catalyst composition was disposed in a reactor to determine its nitrogen oxide conversion capabilities in a simulated exhaust gas stream. An ultra-low sulfur diesel (ULSD) fuel having a boiling point of less than 210° C. was used as a reductant. The reduction in NOx concentration relates to catalytic activity of the catalyst compositions.

A simulated exhaust gas stream containing an exhaust gas composition was used. The exhaust gas composition included 9 percent $O_2$, 300 parts per million NO, 7 percent $H_2O$, and the balance $N_2$. The gas hour space velocity (GHSV) was about 30,000 $hr^{-1}$. For sulfation, about 5 ppm $SO_2$ is added in nominal conditions and passed for 8 hours at 350° C. For desulfation, the gas composition included an oxygen concentration varying from zero to about 3 percent, about 300 parts per million of NO, 7 percent $H_2O$, and balance $N_2$. The desulfation step was normally carried out at a temperature varying from about 300° C. to about 500° C.

The temperature dependent NOx reduction activities of the different compositions at different test conditions are plotted as shown in FIG. 1-16. The comparison of amount of byproducts of the emission treatment system in the absence and presence of lithium sulfur scavenger is plotted in FIG. 17-18.

Test Results

Figure 2:
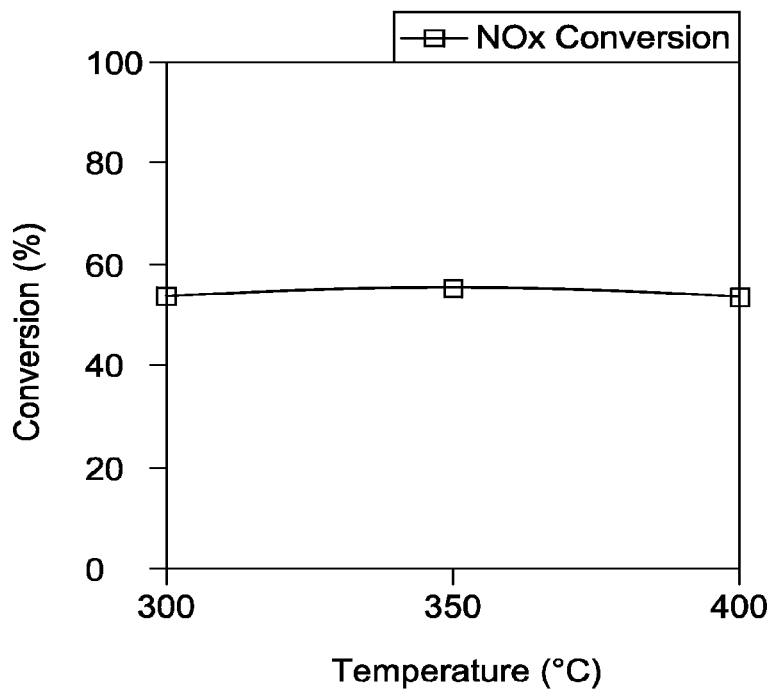
FIG. 2 is a graph depicting the NOx reduction activity of 1 mole percent Li doped, fresh 4.5 mole percent Ag-TA, in accordance with one embodiment of the invention.
Figure 3:
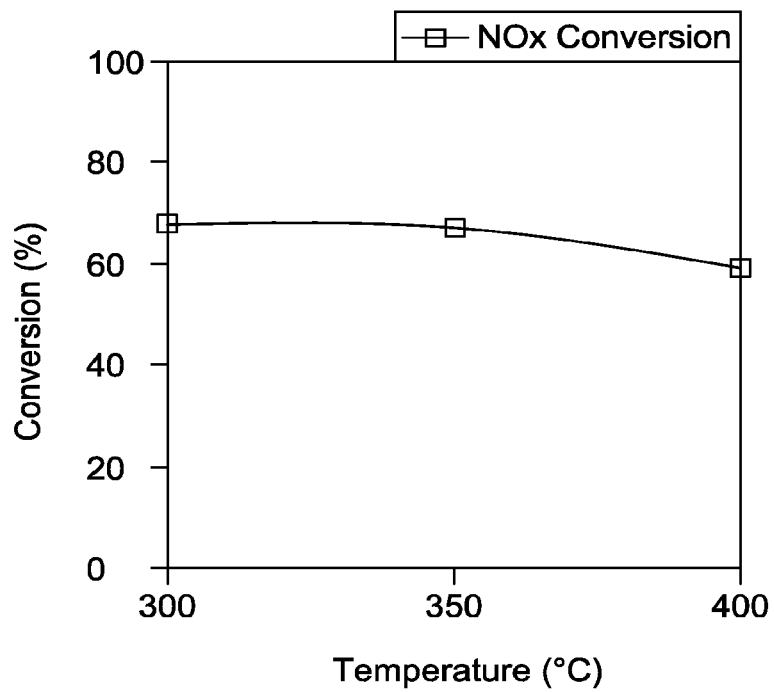
FIG. 3 is a graph depicting the NOx reduction activity of 5 mole percent Li doped, fresh 4.5 mole percent Ag-TA, in accordance with one embodiment of the invention.
Figure 4:
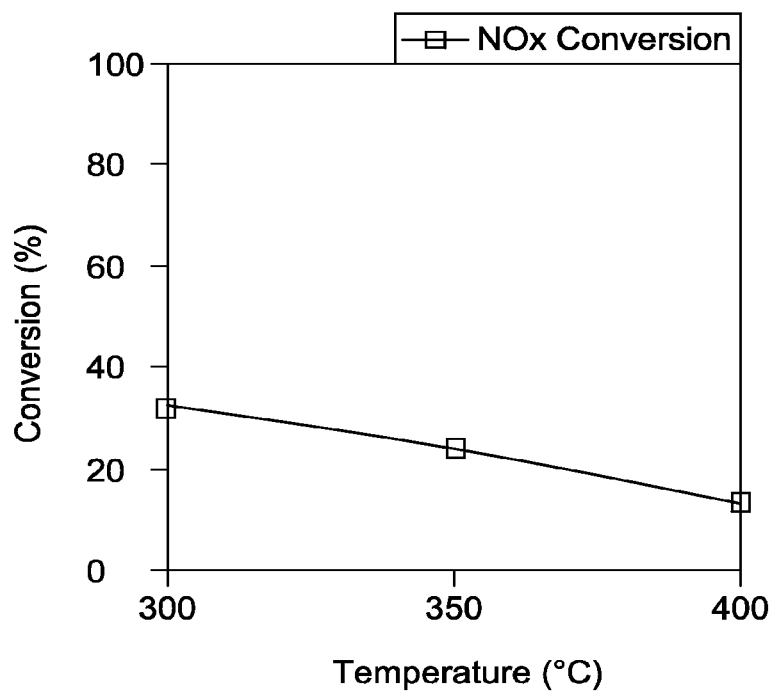
FIG. 4 is a graph depicting the NOx reduction activity of 14 mole percent Li doped, fresh 4.5 mole percent Ag-TA, in accordance with one embodiment of the invention.
Figure 5:
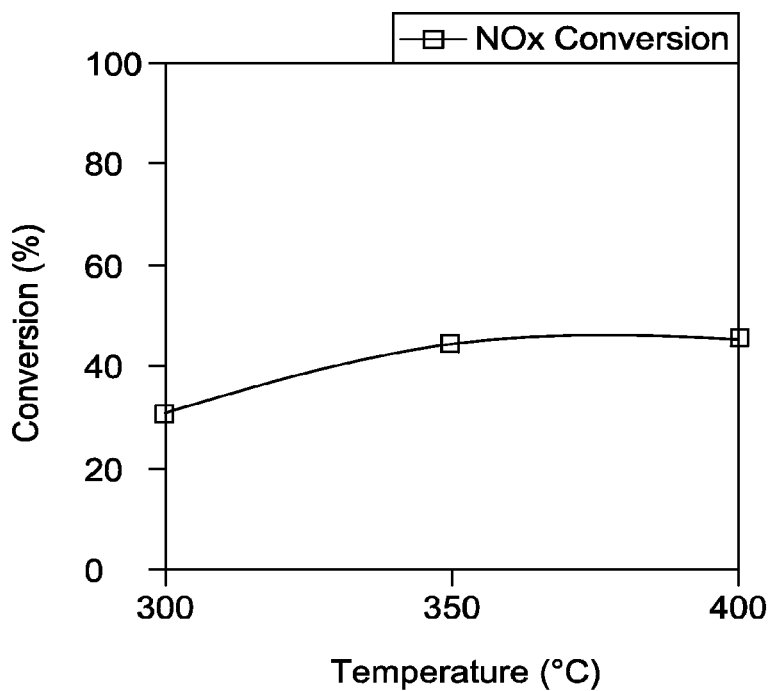
FIG. 5 is a graph depicting the NOx reduction activity of undoped, 4.5 mole percent silver on templated amorphous alumina (Ag-TA) catalyst composition after an hour of operation.
Figure 6:
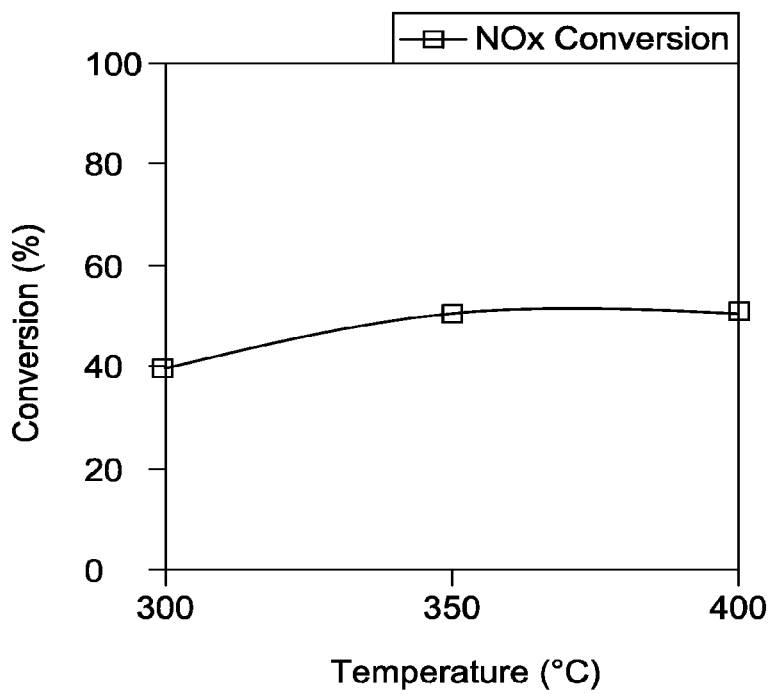
FIG. 6 is a graph depicting the NOx reduction activity of 1 mole percent Li doped, 4.5 mole percent Ag-TA after an hour of operation, in accordance with one embodiment of the invention.
Figure 7:
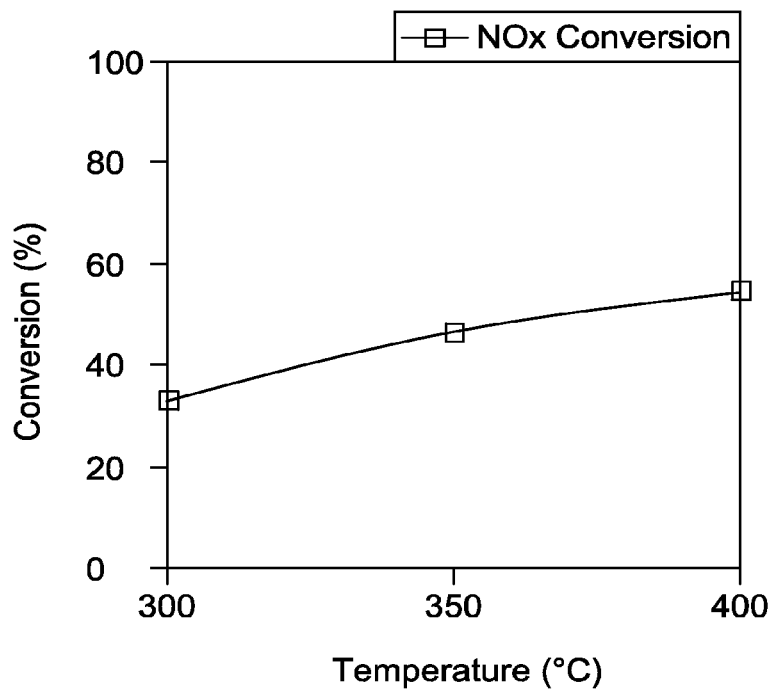
FIG. 7 is a graph depicting the NOx reduction activity of 5 mole percent Li doped, 4.5 mole percent Ag-TA after an hour of operation, in accordance with one embodiment of the invention.
Figure 8:
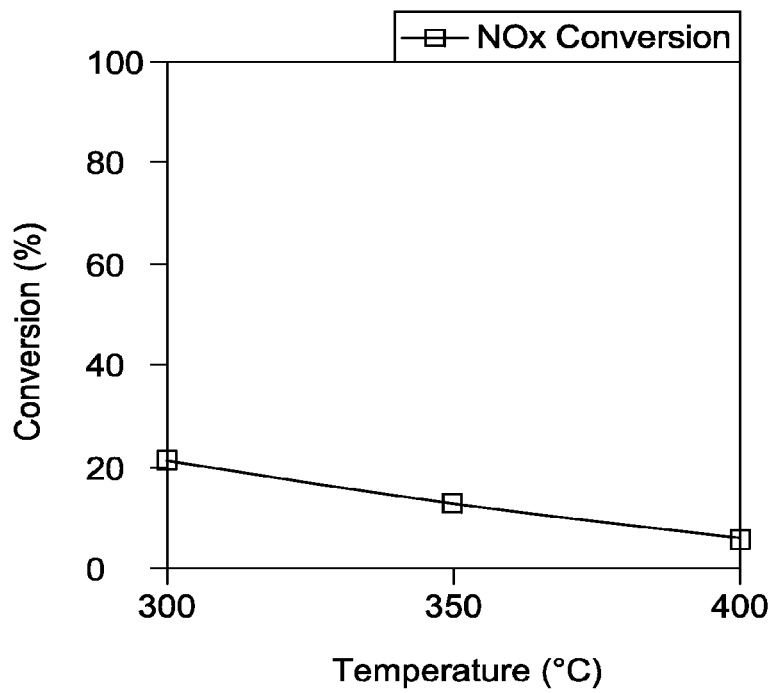
FIG. 8 is a graph depicting the NOx reduction activity of 14 mole percent Li doped, 4.5 mole percent Ag-TA after an hour of operation, in accordance with one embodiment of the invention.

FIG. 1 illustrates the $NO_x$ activities of the fresh 4.5 mol % Ag-TA catalyst composition without the addition of lithium, while FIG. 2, FIG. 3, and FIG. 4 illustrate the $NO_x$ activities of the fresh 4.5 mol % Ag-TA catalyst composition with 1%, 5%, and 14% respectively of Li addition as a sulfur scavenger. Similarly, FIG. 5 illustrates the NOx acitivities of the 4.5 mol % Ag-TA catalyst composition without the addition of lithium, after about an hour of operation, while FIG. 6, FIG. 7, and FIG. 8 illustrate the $NO_x$ activities after one hour of operation of the 4.5 mol % Ag-TA catalyst composition with 1%, 5%, and 14% respectively of Li addition as a sulfur scavenger.

Figure 9:
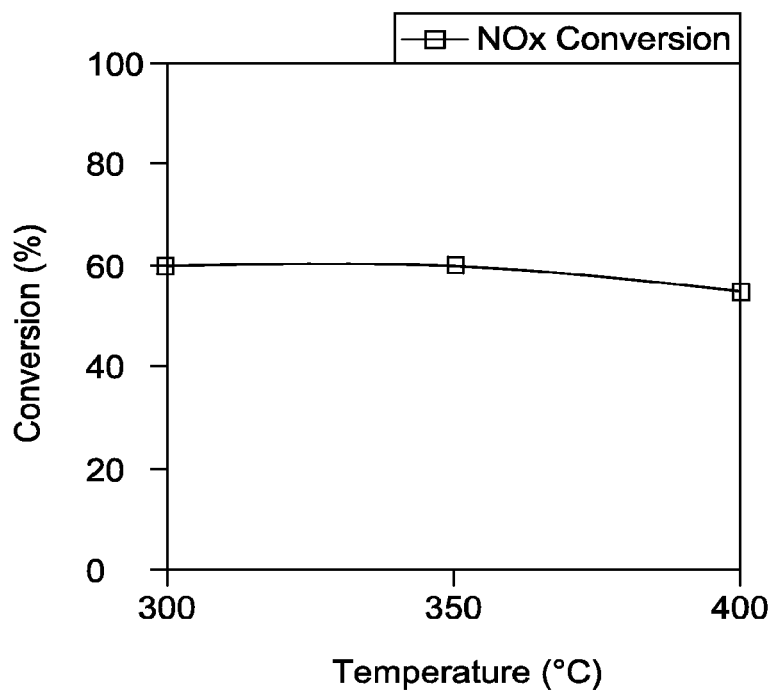
FIG. 9 is a graph depicting the after sulfation-NOx reduction activity of undoped, fresh 4.5 mole percent silver on templated amorphous alumina (Ag-TA) catalyst composition.
Figure 10:
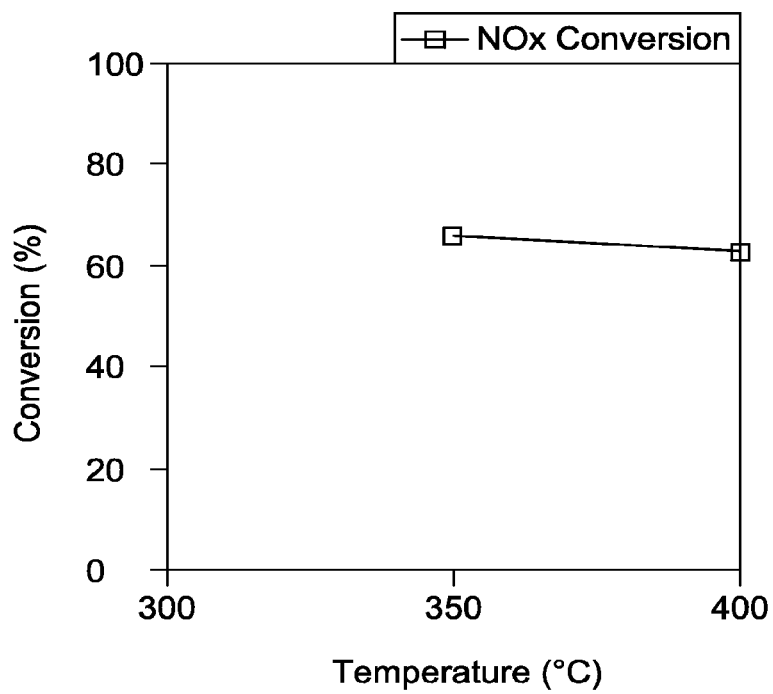
FIG. 10 is a graph depicting the after sulfation-NOx reduction activity of 1 mole percent Li doped, fresh 4.5 mole percent Ag-TA, in accordance with one embodiment of the invention.
Figure 11:
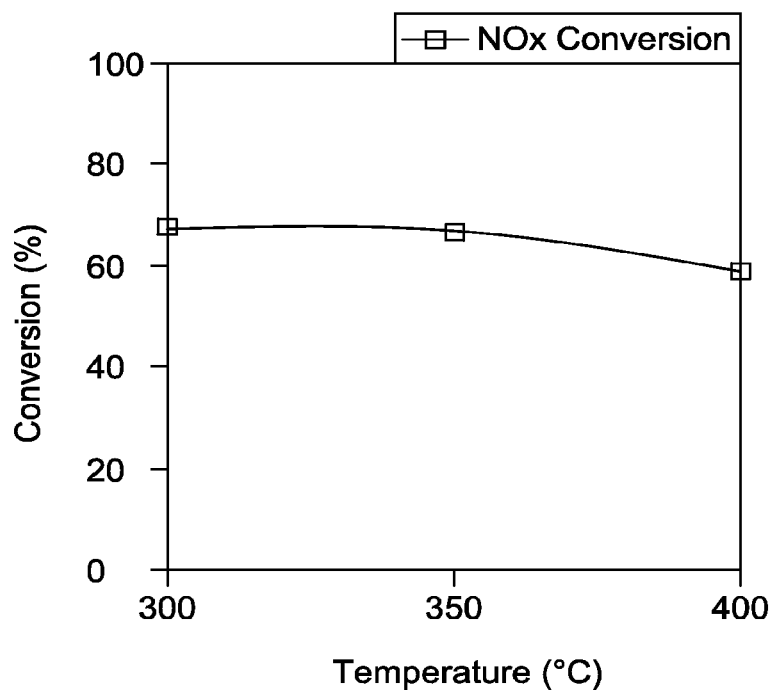
FIG. 11 is a graph depicting the after sulfation-NOx reduction activity of 5 mole percent Li doped, fresh 4.5 mole percent Ag-TA, in accordance with one embodiment of the invention.
Figure 12:
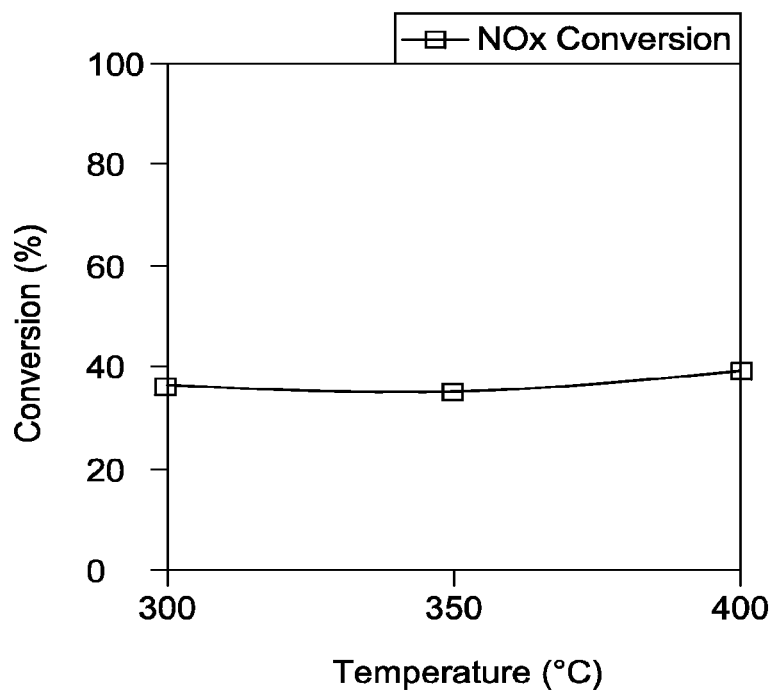
FIG. 12 is a graph depicting the after sulfation-NOx reduction activity of 14 mole percent Li doped, fresh 4.5 mole percent Ag-TA, in accordance with one embodiment of the invention.
Figure 13:
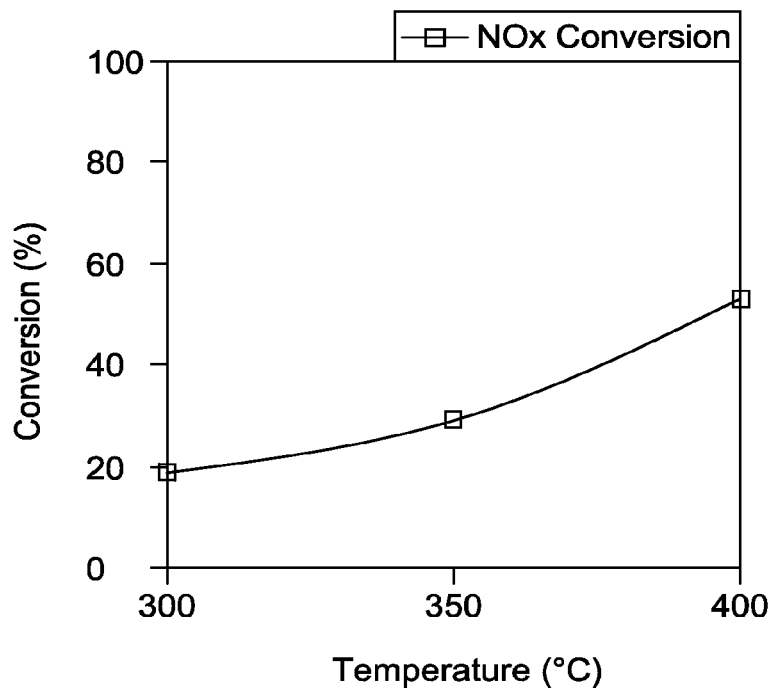
FIG. 13 is a graph depicting the after sulfation-NOx reduction activity of undoped, 4.5 mole percent silver on templated amorphous alumina (Ag-TA) catalyst composition after an hour of operation, in accordance with one embodiment of the invention.
Figure 14:
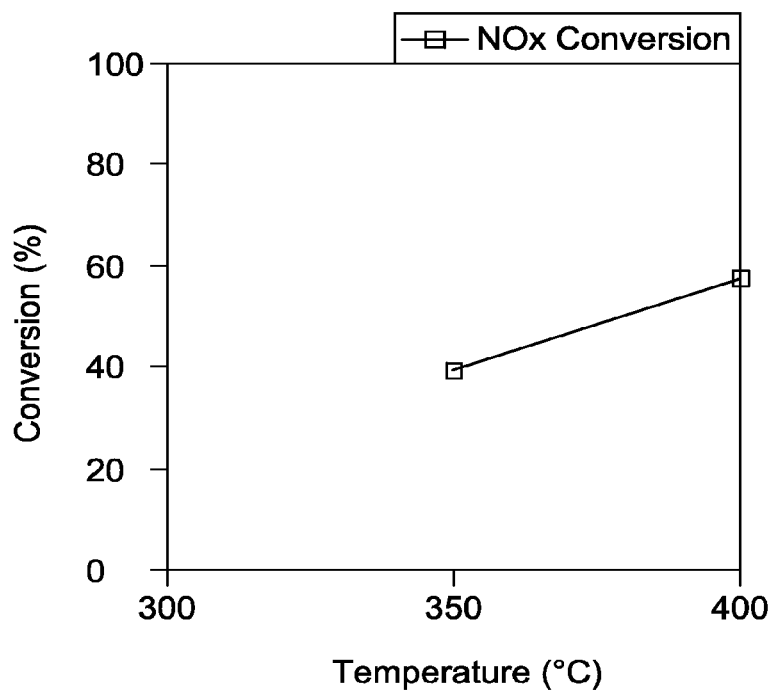
FIG. 14 is a graph depicting the after sulfation-NOx reduction activity of 1 mole percent Li doped, 4.5 mole percent Ag-TA after an hour of operation, in accordance with one embodiment of the invention.
Figure 15:
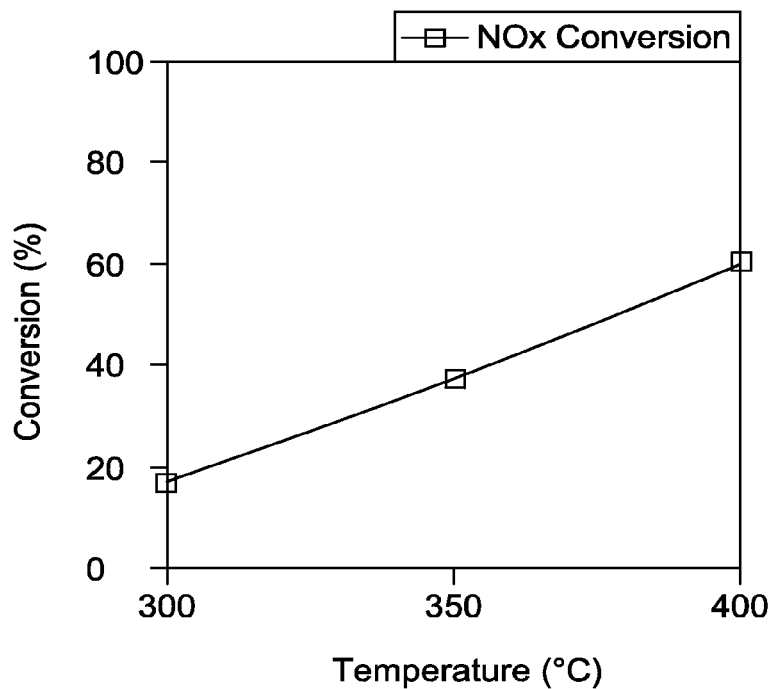
FIG. 15 is a graph depicting the after sulfation-NOx reduction activity of 5 mole percent Li doped, 4.5 mole percent Ag-TA after an hour of operation, in accordance with one embodiment of the invention.
Figure 16:
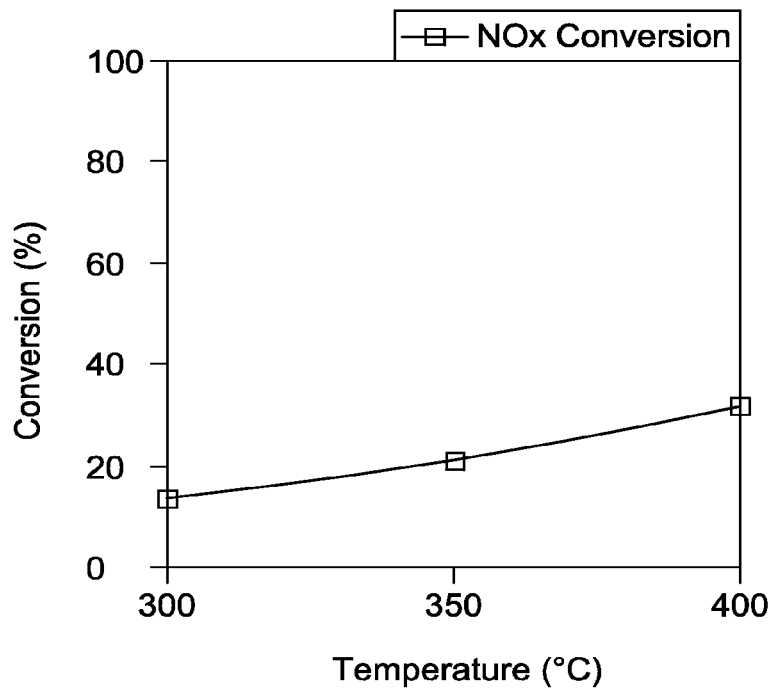
FIG. 16 is a graph depicting the after sulfation-NOx reduction activity of 14 mole percent Li doped, 4.5 mole percent Ag-TA after an hour of operation, in accordance with one embodiment of the invention.

FIG. 9 illustrates the $NO_x$ activities of the sulfated fresh 4.5 mol % Ag-TA catalyst composition without the addition of lithium, while FIG. 10, FIG. 11, and FIG. 12 illustrate the $NO_x$ activities after sulfation of the fresh 4.5 mol % Ag-TA catalyst composition with 1%, 5%, and 14% respectively of Li addition as a sulfur scavenger. Similarly, FIG. 13 illustrates the NOx acitivities of the 4.5 mol % Ag-TA catalyst composition without the addition of lithium, after about an hour of sulfation, while FIG. 14, FIG. 15, and FIG. 16 illustrate the $NO_x$ activities after one hour of sulfation of the 4.5 mol % Ag-TA catalyst composition with 1%, 5%, and 14% respectively of Li addition as a sulfur scavenger.

By comparing these graphs, it can be seen that during initial operation and during operation after sulfation, addition of 1% or 5% lithium improves NOx activity during initial stages and after one hour of operation. 1% and 5% lithium addition seem to be comparatively better than 14% Li addition. Between 1% and 5% lithium addition, 5% Li addition comparatively improves the high temperature NOx activity of Ag-TA catalyst.

Figure 17:
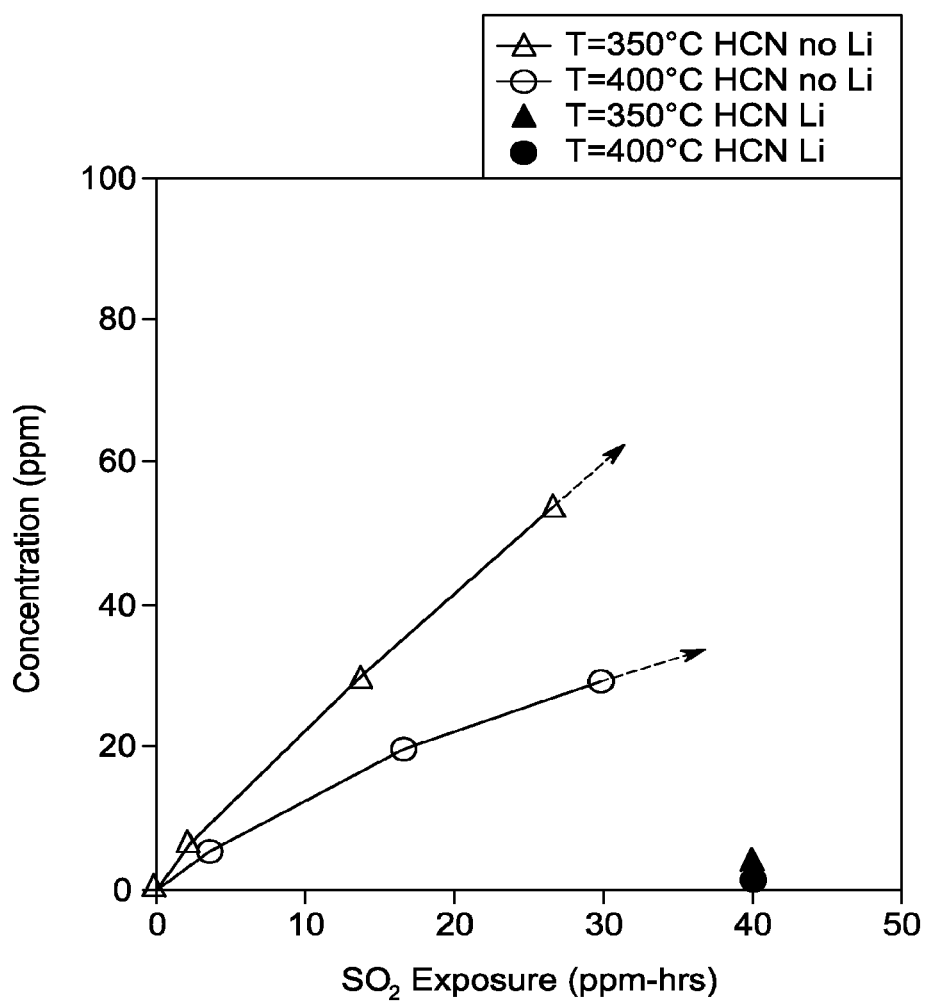
FIG. 17 is a comparative graph depicting amount of HCN during operation of catalytic reduction system using undoped and 1 mole percent Li doped Ag-TA, in accordance with one embodiment of the invention.

FIG. 17 graphically illustrates the comparison of temperature dependent HCN byproduct formation in the absence and presence of 1% Li addition to the Ag-TA catalyst. The HCN by product during NOx reduction over undoped 4.5 mol % Ag-TA catalyst is about 30-70 ppm depending on the temperature of operation, while for the Li doped 4.5 mol % Ag-TA catalyst only about 0-5 ppm of HCN by products were determined.

Figure 18:
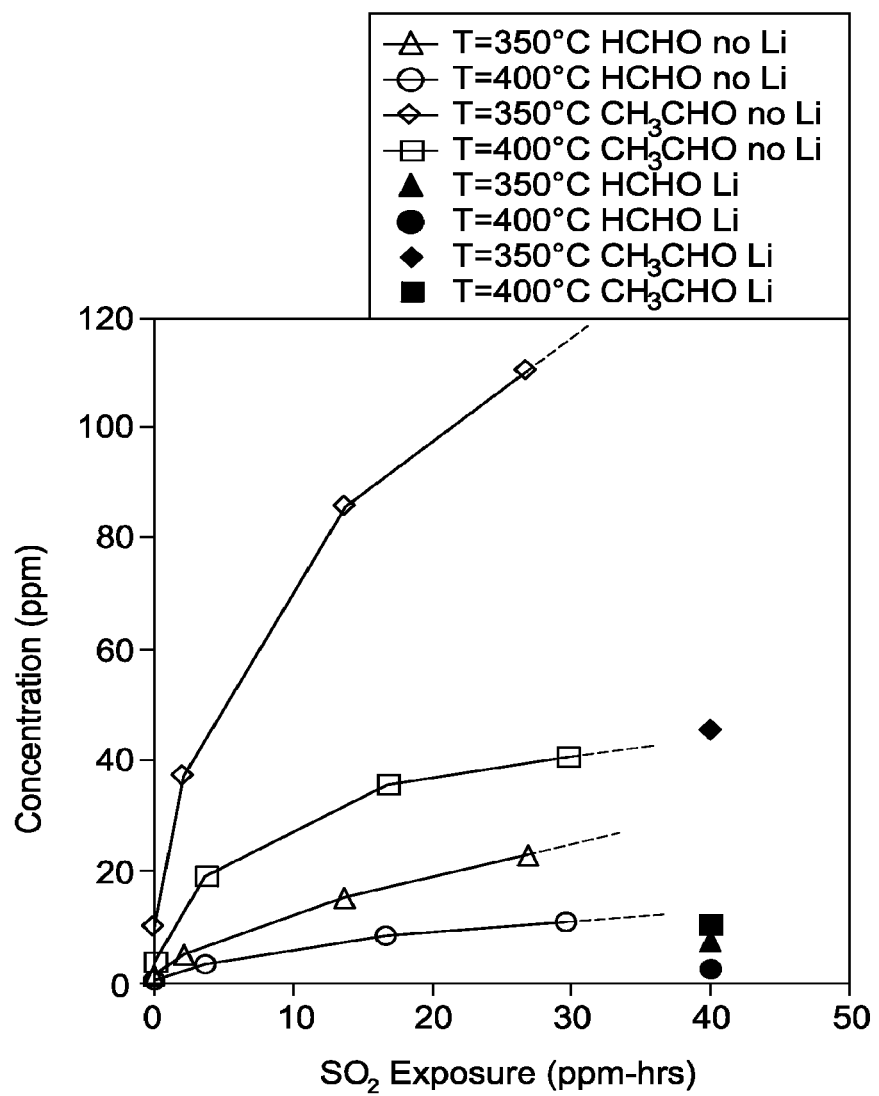
FIG. 18 is a comparative graph depicting amounts of $CH_3CHO$ and HCHO during operation of catalytic reduction system using undoped and 1 mole percent Li doped Ag-TA, in accordance with one embodiment of the invention.

FIG. 18 compares the effect of Li addition in the formation of $CH_3CHO$ and HCHO. It can be observed that the $CH_3CHO$ formation reduces from about 40-130 ppm to a range of about 10-40 ppm after 1% Li addition. The HCHO formation reduces from about 10-30 ppm to a range of about 5-10 ppm after 1% Li addition.

The embodiments described herein are examples of composition, system, and methods having elements corresponding to the elements of the invention recited in the claims. This written description may enable those of ordinary skill in the art to make and use embodiments having alternative elements that likewise correspond to the elements of the invention recited in the claims. The scope of the invention thus includes composition, system and methods that do not differ from the literal language of the claims, and further includes other compositions and articles with insubstantial differences from the literal language of the claims.

While only certain features and embodiments have been illustrated and described herein, many modifications and changes may occur to one of ordinary skill in the relevant art. The appended claims cover all such modifications and changes.

The invention claimed is:

1. A method of preparation of a catalyst composition, comprising:
   combining a metal oxide precursor, a catalyst metal precursor and a sulfur scavenger precursor in the presence of a templating agent to form a combination;
   hydrolyzing and condensing the combination so that the sulfur scavenger precursor is converted to a sulfur scavenger compound and the catalyst metal precursor is converted to a catalyst metal to form an intermediate product that comprises metal oxide, a sulfur scavenger compound and catalyst metal wherein the sulfur scavenger compound is comprised of an alkali metal cation; and
   calcining the intermediate product to form a templated amorphous metal oxide substrate having a plurality of pores wherein the sulfur scavenger compound and catalyst metal are dispersed in an intermixed form in the metal oxide substrate and wherein the sulfur scavenger compound comprises an alkali metal containing material wherein the sulfur scavenger compound is lithium hydroxide and/or lithium aluminum oxide.

2. The method of claim 1 wherein the catalyst metal is silver metal.

3. The method of claim 1 wherein the metal oxide substrate is comprised of alumina.

4. The method of claim 1 wherein the metal oxide substrate is free of silica.

5. The method of claim 1 wherein the sulfur scavenger precursor is $LiNO_3$.

6. The method of claim 1 wherein the metal oxide substrate is amorphous alumina, and the catalyst metal is silver metal.

7. The method of claim 1 wherein the templating agent comprises a surfactant, a cyclodextrin, a crown ether, or mixtures thereof.

8. A method of removing sulfur from a catalytic reduction system, comprising: passing an exhaust stream from an exhaust source over a catalyst composition prepared by the method of claim 1;
   reacting the exhaust stream with the catalyst composition to form sulfates; decomposing the sulfates to produce sulfur oxides; and removing the sulfur oxides from the catalytic reduction system.

9. The method of claim 8, wherein reacting the exhaust stream comprises reacting the exhaust stream with the sulfur scavenger compound of the catalyst composition to form the sulfates.

10. A catalyst composition produced by the method of claim 1.

* * * * *